United States Patent
Walter (10) Patent No.: US 9,912,153 B2
(45) Date of Patent: Mar. 6, 2018

(54) METHOD FOR CONTROLLING THE RATIO BETWEEN SUPPLIED AND DRAWN ELECTRIC ENERGY IN AN ELECTRIC ENERGY SUPPLY NETWORK

(75) Inventor: Thomas Joachim Walter, Karlsruhe (DE)

(73) Assignee: EASY SMART GRID GmbH, Karlsruhe (DE)

(*) Notice: Subject to any disclaimer, the term of this patent is extended or adjusted under 35 U.S.C. 154(b) by 491 days.

(21) Appl. No.: 14/415,901

(22) PCT Filed: Jul. 19, 2012

(86) PCT No.: PCT/EP2012/064219
§ 371 (c)(1),
(2), (4) Date: Apr. 6, 2015

(87) PCT Pub. No.: WO2014/012595
PCT Pub. Date: Jan. 23, 2014

(65) Prior Publication Data
US 2015/0280434 A1    Oct. 1, 2015

(51) Int. Cl.
*G05B 19/042* (2006.01)
*H02J 3/00* (2006.01)
(Continued)

(52) U.S. Cl.
CPC ............ *H02J 3/008* (2013.01); *G05B 19/042* (2013.01); *H02J 3/14* (2013.01); *H02J 3/38* (2013.01);
(Continued)

(58) Field of Classification Search
CPC ..... H02J 3/008; H02J 3/14; H02J 3/38; G05B 19/042; G05B 2219/2639; Y02B 70/3225; Y04S 20/222; Y04S 50/10
(Continued)

(56) References Cited

U.S. PATENT DOCUMENTS

2003/0155773 A1    8/2003  Wobben
2004/0010478 A1    1/2004  Peljto et al.
(Continued)

FOREIGN PATENT DOCUMENTS

DE         2938696        4/1981
DE      102005049426      4/2007
(Continued)

OTHER PUBLICATIONS

IEEE Paper On: A Market-Based Multi-Agent-System for Decentralized Power and Grid Control, by: Tobias Linnenberg, Published Year: 2011.*

*Primary Examiner* — Robert Fennema
*Assistant Examiner* — Jigneshkumar Patel
(74) *Attorney, Agent, or Firm* — Volpe and Koenig, P.C.

(57) ABSTRACT

A method for controlling the ratio between injected and extracted electric energy in an electric energy supply grid with a number of grid participants, which are selected from a group including producers, consumers, and storage devices, with at least two of the group being included. A grid state variable is used as a control variable, the value of said variable depending on the ratio between inserted and extracted electric energy and being ascertainable from the grid by the grid participants. The invention is characterized in that a number of grid participants ascertain the grid state variable from the grid and use said variable at least indirectly to control the grid in a decentralized manner based on a respective specific grid participant behavior.

10 Claims, 6 Drawing Sheets

(51) Int. Cl.
*H02J 3/14* (2006.01)
*H02J 3/38* (2006.01)

(52) U.S. Cl.
CPC ... *G05B 2219/2639* (2013.01); *Y02B 70/3225* (2013.01); *Y04S 20/222* (2013.01); *Y04S 50/10* (2013.01)

(58) Field of Classification Search
USPC .......................................................... 700/295
See application file for complete search history.

(56) References Cited

U.S. PATENT DOCUMENTS

| | | | | |
|---|---|---|---|---|
| 2009/0012916 | A1* | 1/2009 | Barnett | G06Q 50/06 705/412 |
| 2009/0234510 | A1* | 9/2009 | Helle | F03D 7/0284 700/287 |
| 2011/0245987 | A1* | 10/2011 | Pratt | H01M 10/44 700/295 |
| 2012/0080420 | A1 | 4/2012 | Hui et al. | |
| 2013/0096983 | A1* | 4/2013 | Forbes | G06Q 30/0202 705/7.31 |

FOREIGN PATENT DOCUMENTS

| | | |
|---|---|---|
| DE | 102010030093 | 12/2010 |
| EP | 1914420 | 4/2008 |
| EP | 2075890 | 7/2009 |
| GB | 2473908 | 3/2011 |
| WO | 2007052349 | 10/2007 |

\* cited by examiner

METHOD FOR CONTROLLING THE RATIO BETWEEN SUPPLIED AND DRAWN ELECTRIC ENERGY IN AN ELECTRIC ENERGY SUPPLY NETWORK

BACKGROUND

The invention relates to a method to control the ratio between electrical energy injected into and extracted from an electric energy supply grid. This electric energy supply grid includes a number of grid participants selected from a group of producers, consumers and storage devices, where at least two elements from this group must be present. To control the ratio between electric energy injected and extracted, a grid state variable is used as the control parameter. The value of this grid state variable depends on the ratio between the electric energy injected and extracted and can be determined by the grid participants from the grid itself.

Further the invention relates to an electric energy supply grid and a grid participant of an electric energy supply grid.

Furthermore the invention relates to a method to control the specific grid participation behaviour in such an electric energy supply grid, a control module and software for such a control module to perform this method.

SUMMARY

The invention relates to the following technical problem: In electric energy supply grids with a number of grid participants the sum of electric energy injected and extracted must approximately equal zero to operate the grid in a stable way. Deviations from the balance of electric energy injected and extracted could lead to an overload of the electric energy supply grid and/or undersupply of electric energy to grid participants. If these deviations become too large, this can lead to a grid breakdown. Therefore active stabilization respectively control of the electric energy supply grid is necessary. This traditionally is the task of grid operators, i.e. the large energy supply companies.

By increased use of renewable energies, however, it is no longer possible to centrally provide electric energy according to demand. By these alternative electric energy production techniques, e.g. solar or wind energy, production of electric energy becomes increasingly dependent on season and weather. Compared to electric energy production in the past, it also shifts to smaller and decentralized units. Thereby the influences of large energy producing companies and grid operators on the electric energy supply grids and hence on grid stability shrinks.

The known state of the art includes various methods to stabilize the grid:

Traditionally electric energy supply grids are organized such that several grid participants including energy producers, energy consumers and energy storage devices are connected to each other. Individual grid participants, as they are described and the term is used in the present invention, can act as consumers and/or producers and/or storage devices of electric energy, or only as consumers or producers or storage.

According to the individual grid participation behaviour of the individual grid participants concerning energy consumption, i.e. the extraction of electric energy from the grid, and energy production, i.e. the injection of electric energy into the grid, deviations between electric energy injected and extracted may occur in the electric energy supply grid. It is the responsibility of the electric energy supply grid operator to control these deviations and thus guarantee stability of the electric energy supply grid. The task to avoid undersupply of electric energy to the totality of grid participants as well as prevent overload of the electric energy supply grid therefore is the core responsibility of few large energy suppliers.

To achieve this, the large energy suppliers own control equipment provided with algorithms to trigger measures that control grid stability. As a measure of grid stability a grid state variable connected to the grid state is used as a control variable. The grid state variable is maintained within a pre-determined range around a base value. Examples of grid state variables are grid frequency or voltage.

In the following example this is further detailed for grid frequency that is used as a control variable:

The base value of grid frequency in Europe is 50 Hz as a standard, and 60 Hz in the United States of America. The base value is the target value of the grid frequency, which means that any deviation from the base value signals the need to take control measures towards grid stability. If energy generation exceeds energy consumption, grid frequency increases. If energy consumption exceeds energy generation, grid frequency drops. If the grid operator detects a deviation of grid frequency from the base value, grid load is controlled, i.e. the grid operator centrally takes measures leading to correction of the deviation and therefore to stabilisation of the grid:

If grid frequency drops below base value, the grid operator increases injection of electric energy into the electric energy supply grid. If grid frequency increases above base value, the grid operator extracts electric energy from the electric energy supply grid. Possible control measures to achieve this are the use of small flexible power plants and additional loads and, if necessary, switching off of some grid areas or individual consumers. In times of increased consumption undersupply can be avoided by adding flexible power plants if the grid frequency falls below the base value. Some types of power generation units such as wind power plants can also be used as energy consumers to compensate for oversupply of energy (DE 10 2005 049 426 A1). The disadvantage of this approach is, however, that during this period surplus energy is wasted and high additional cost is caused.

Another possibility to stabilize the grid are power storage plants. Such plants absorb surplus energy during periods with energy oversupply. This surplus energy is stored e.g. in a pumped hydro or heat storage plant. During periods of energy undersupply, stored energy can be fed back into the electric energy supply grid. Thus energy supply peaks that would lead to overload of the electric energy supply grid can be absorbed, and energy undersupply of grid participants be avoided. The storage technologies available, however, are not able to solve the issue of grid stability in the long term with respect to cost, efficiency and life time. Specifically with respect to increased use of season and weather dependent, and decentralised renewable energy generation the capacity limits of these storage technologies are reached quickly.

Further from the state of art concepts are known that adapt consumption to currently available energy and, vice versa, adapt energy production to energy consumption (DE 10 2010 030 093 A1). These concepts are known as smart grid technologies. Energy producers and consumers must be able to communicate with each other, thus exchanging information on current and future energy consumption, i.e. on energy demand and currently available energy within the electric energy supply grid. All grid participants are integrated in this communication so that ideally the quantity of energy produced is exactly the same as the demand on the consumer side.

Smart grid concepts foresee the use of a connected computer architecture that should facilitate the necessary co-ordination processes and the corresponding influence on energy producers and consumers.

This constitutes a disadvantage of the use of smart grid concepts with respect to reliability and practicability, as it is necessary to install a communication network fully covering the electric energy supply grid. Additionally central control and co-ordination of all decentralized processes concerning energy injection and extraction is necessary.

The technical challenge to keep an electric energy supply system stable so far has not been solved satisfactorily in view of the decreasing influence of large energy producers, and the increasing amount of electric energy generated in a decentral and fluctuating way.

Against this background the task of the invention presented here is to provide a method to control the ratio between energy injected and energy extracted, an electric energy supply grid and associated grid participants, and methods to control the grid participation behaviour including control modules and pieces of software, which help to allocate the task of grid stabilisation not only to the large producers, but distribute it to a multitude of grid participants without having to operate a parallel communication network with its associated administrative effort and energy consumption.

The invention solves this task by a method with the characteristics an electric energy supply grid, a grid participant, a control module and a piece of software. Further advantageous embodiments of the invention are the object of the sub claims. The wording of the claims by explicit reference is hereby incorporated into the description.

With the present invention a large number of grid participants, in addition to the large energy producers already responsible in the past, is enabled to contribute, in a decentralized way, to the stabilisation of the grid, without the need to completely re-build the electric energy supply grid or to build additional structures. Moreover, the present invention can be used within the existing structures, and these structures can be equipped according to the invention step by step. In particular, customers which are grid participants do not need to replace or upgrade their electric energy consuming equipment, but they may do so if they wish.

According to the invention the method to control the ratio between electric energy injected and extracted in an electric energy supply grid with a number of grid participants, similar to the already known method uses a grid state variable as the control variable, whose value depends on the ratio between electric energy injected into and extracted from the energy supply grid.

The novelty of the invention is that a number of grid participants determines the grid state variable in a decentralized way from the grid and uses it at least indirectly to control their own specific grid participation behaviours.

In addition, the invention is based on the insight that the shift of responsibility for grid stabilisation away from the grid operators to individual grid participants can be optimally enabled only by the decentralized application of market laws at a number of electric energy supply grid participants. The individual specific grid participation behaviour of each grid participant, in combination with the individual specific grid participation behaviour of the other grid participants, in their totality contributes to the stabilisation of the electric energy supply grid.

The invention does not take the route to a direct, automatic, centralised or decentralised control of the grid participants. For a majority of grid participants this direct control would be disadvantageous as their individual demand or technically optimal operating modes, e.g. to achieve optimum efficiency, cannot be considered. The number of grid participants that can be controlled directly by a specific control variable, without application of market laws, is limited and not sufficient in their totality to solve the present challenge.

To ensure that grid participants contribute to grid stabilisation in a decentralised way, in the present invention preferably incentives are set that are individually advantageous for each grid participant. These individual incentives must be set such that in the totality of grid participants they lead to grid stabilization. To achieve this, grid participants must be enabled to apply the market laws autonomously which is achieved by another aspect of the present invention:

In an electric energy supply grid with a number of grid participants including producers and/or consumers and/or storage devices, a grid state variable is used as the control variable whose value depends on the ratio between energy injected and extracted. This grid state variable can be determined at least by some of the grid participants from the grid and may e.g. be the grid frequency. This grid state variable is coupled with a valuation variable. In case of an optimal ratio between energy injected and extracted the valuation variable is equivalent to a base value. In case of a deviation of the ratio from this optimal value the valuation variable takes on a value that deviates from the base value. The deviation of the valuation variable from the base value is designed such that, in case of surplus injection of electric energy, the injection of electric energy into the grid is associated with a malus value for the grid participant and the extraction with a bonus value. In an analogous way the deviation of the valuation variable from the base value in case of surplus extraction of electric energy is designed such that the injection of electric energy into the grid is associated with a bonus value for the grid participant and the extraction with a malus value for the grid participant.

The grid participant determines the grid state variable and/or the deviation of this variable from its base value from the energy supply grid in a decentralized way and uses it at least indirectly to control its own specific grid participation behaviour. This specific grid participation behaviour hereby is individually controlled by each grid participant provided with the method according to this invention such that as little malus values and/or as many bonus values as possible are generated.

It is an advantageous embodiment that optimisation of the own specific grid participation behaviour by each grid participant contributes in its totality to the stabilisation of the whole electric energy supply grid. This is the case even though the individual grid participant does not have the objective of stabilising the electric energy supply grid, but aims to optimise its own behaviour of electric energy injection into or extraction from the grid. Due to the multitude of grid participants the optimisation of individual grid participation behaviour implicitly contributes to the stabilisation of the electric energy supply grid. The method implemented according to the invention does not need additional communication installations. The necessary information can be derived by the grid participant in a decentralised manner directly from the electric energy supply grid.

According to the invention the specific grid participation behaviour may at any time be made dependent on own demands of the grid participant which may have priority relative to grid stabilisation. At the same time grid participants may remain unchanged and still be connected to the grid, even if they cannot determine the grid state variable and control their grid participation behaviour according to the grid state variable. The invention therefore has the advantage of being backward compatible.

In a preferred implementation the grid state variable and therefore the valuation variable is directly coupled with the price per energy unit. A high valuation variable means a high price per energy unit, and a low valuation variable a low price per energy unit.

In a further preferred implementation the grid state variable is determined in certain time intervals or specifically and preferentially continuously, in a decentralised manner by at least some of the grid participants, and the specific grid participation behaviour is adapted dynamically.

In a further preferred implementation the own specific grid participation behaviour is controlled depending on the grid state variable and/or a valuation variable. Advantageously a variable price per electric energy unit is used as a valuation variable. In case of surplus energy production, the price per energy unit drops and with it the valuation variable. Energy consumers or energy storage devices which extract energy from the electric energy supply grid at these periods therefore pay a lower price. Energy producers or energy storage devices which inject energy into the electric energy supply grid during this period receive a lower price per energy unit. Energy consumers or storage devices which control their grid participation behaviour based on the valuation variable extract energy preferably in this period e.g. to operate processes that are not time critical, or to fill energy storage. Thereby energy producers and storage devices which control their grid participation behaviour based on the valuation variable will inject as little energy as possible into the electric energy supply grid. The grid participation behaviour therefore counteracts the deviation of the valuation variable from the base value. The consequence is an automatic self-stabilisation of the electric energy supply grid.

In the case of scarcity of energy production the grid state variable changes and therefore also the valuation variable. The price per energy unit increases. Energy consumers or storage devices which extract energy from the energy supply grid during these periods therefore pay a higher price. Energy producers or storage devices that inject energy into the grid during this period receive a higher price per energy unit. In analogy to the situation described above the individual grid participation behaviour will change: Energy consumers or storage devices which control their grid participation behaviour according to the valuation variable consume as little energy as possible during that period and shift non-critical (not urgent) processes to a later time, for example. Energy producers or storage devices which control their grid participation behaviour based on the grid state variable inject as much energy as possible into the energy supply grid during that period to earn a price per energy unit which is as high as possible. Thereby also here the individual grid participation behaviour counteracts the deviation of the valuation variable from its base value. Again the consequence is automatic self-stabilisation of the grid.

By coupling the valuation variable with the price per energy unit incentives are set for the individual grid user to extract energy from the electric energy supply grid preferably during periods of surplus production, and to inject energy preferably during periods of surplus consumption. As a consequence the optimisation of their own specific grid participation behaviours, i.e. the following of their individual interests, in totality acts in a stabilizing way on the electric energy supply grid.

With the present invention also the so-called "swarm" concept can be realized that so far could not be solved in a technically satisfying way. This concept considers a multitude of small (micro) combined heat and power (μCHP) plants which produce both electric and usable thermal energy e.g. from fossil fuels, and realizes a very high energy saving potential by the resulting total conversion efficiency. Individual μCHP plants are located decentrally in single or multi-family houses where thermal energy can be directly utilized without transport and associated loss. The electric energy generated during operation is directly injected into the grid. The thermal energy can be stored easily and—compared with electric energy—at much lower cost. Thus this "swarm" consisting of a multitude of small and very small CHP plants can be controlled by electric energy demand, which essentially means that they operate when demand for electric energy in the grid is high.

As these CHP plants are equipped according to the invention, they determine the grid state variable in a decentralized way from the grid and by this detect by themselves if the grid has demand for electric energy supply. Depending on the status of the thermal storage and/or the current demand for thermal energy each of the CHP plants within the swarm controls itself such that electric energy is injected into the grid preferably when there is demand for it. In the totality of the "swarm" of CHP plants this leads to an efficient and demand oriented generation and injection of electric energy, even though the individual CHP plants in an advantageous implementation are not rigidly coupled to the demand of the electric grid, but also consider their own individual demand situations.

Within the framework of the present invention such a "swarm" concept with a multitude of small and smallest CHP plants can be realized without any problems, without having to install and operate performant communication and automation infrastructure for central control of the CHP plants, as this was the case in previous efforts.

Within the framework of the present invention it also becomes possible for a grid participant to implement a business model where energy is extracted from the grid only with the purpose to re-inject it at a different time when the price per energy unit is higher. This will lead to the emergence of energy storing grid participants which additionally contribute to grid stabilisation. By application of this invention operators of decentralised energy supply installations, such as photovoltaic plants, receive additional incentives to install devices to store generated energy in a buffer to be able to inject it into the grid at later times of higher demand. Hereby problematic variations in electric energy generation by renewable energies are evened out.

In another preferential implementation the grid state variable is maintained between a maximum and minimum value around the base value. If the grid state variable leaves the range between maximum and minimum values, the grid operator takes central control measures that keep the grid state variable within the desired range between maximum and minimum value. One of these emergency measures could be to switch off partial areas of the grid.

In a preferential implementation the grid state variable and therefore the valuation variable on average is kept at the base value by additional central control measures over a certain period, preferably 24 hours. Grid participants that do not control their extraction and/or injection behaviour depending on the grid state variable in his case pay an average price per energy unit associated with the base value.

In another preferential implementation the own specific grid participation behaviour is controlled by a specific algorithm that generates a specific time dependent demand function. This algorithm can be individually adapted to each grid participant.

In a preferential implementation the demand function contains limit values for the deviation of the grid state valuable from the base value. When these limit values are reached, the specific grid participation behaviour changes. Specifically the limit values of the demand function preferably will be variable over time.

In another preferential implementation the specific time dependent demand function considers parameters like the time until next use of a load, state of charge of a storage device, and the risk behaviour of the grid participant with respect to price per energy unit.

Particularly preferential are specific algorithms that contain predictions of likely future developments of the valuation variable. This enables grid participants to optimize their individual grid participation behaviour, i.e. their current and future behaviour concerning injection and extraction of energy. Using historic data and experience, the own specific grid participation behaviour can be optimized such that not time-critical energy injection and extraction processes can be shifted to more promising periods concerning the generation of bonus or malus values.

Preferably the specific algorithm combines the specific demand function with the predictions on likely future developments of the valuation variable such that as little malus and/or as many bonus values as possible are generated. In particular the own specific algorithm considers the individual risk behaviour of the specific grid participant.

In another preferential implementation the value range around the base value of the grid state variable between minimum and maximum values is split into several sub ranges, e.g. 256 sub ranges. Here a sub range value of the valuation variable is associated with each sub range, e.g. between 0 and 255.

At the side of the grid participants a priority algorithm is used that calculates a current priority value. In a preferable implementation this priority value lies within the range of the valuation variable. The grid participants compare the priority value with the valuation variable in specific time intervals or preferably continuously. As soon as the current priority value equals the current sub range value of the valuation variable, the grid participants change their own specific grid participation behaviour. In a preferable implementation a grid participant which acts as a consumer or storage of energy will stop extraction of energy from the supply grid as the valuation variable drops below its priority value, whereas extraction of energy re-starts as the valuation variable rises and reaches the priority value. An energy producer will stop and re-start energy injection in an analogous way. Depending on the equipment used by the grid participant, delay and/or hysteresis circuits may be implemented to ensure switching cycles are acceptable for this equipment.

In another preferable implementation the minimum priority value is equivalent to emergency priority. That means a grid participant with a minimum priority value has unlimited access to the electric energy supply grid and will not be switched off whatever the value of the grid state variable. In analogy the maximum priority value for a consumer means that it will only be switched on if the grid state variable reaches its maximum acceptable value and control measures become necessary to maintain grid stability.

Priorities of individual grid participants may change over time. For example a refrigerator will keep the temperature for some time, such that the compressor may be switched on later if energy is scarce. This can be realized in the algorithm for grid participation behaviour by a priority value that regularly is reduced. If energy is scarce, an electric water heater may reduce final temperature or power consumption, e.g. by pulse width modulation. The diversity of such grid participation behaviour algorithms over a multitude of grid participants also contributed to the stabilisation of the grid.

In another preferable implementation the range of the grid state variable between minimum and maximum values around the base value is split into several sub ranges of different sizes, e.g. into 256 sub ranges. The sizes of the sub ranges starting from the base value could shrink both in direction of maximum and minimum values. This narrows down the steps with growing distance from the stability optimum and thus increases the incentives for the grid participants to take grid stabilizing measures.

In a preferable implementation grid frequency is used as the grid state variable. In a preferred embodiment the grid frequency is kept in a range around 50 Hz, e.g. from 49 to 51 Hz by the electric energy supply grid operator. The grid frequency variable within this range is used as the control variable and a measure of the ratio between energy injected and extracted. A high grid frequency indicates a valuation variable that motivates consumers and/or storage devices to extract energy and de-motivates energy producers, while a low grid frequency leads to a valuation variable that de-motivates consumers and/or storage devices to extract energy and motivates energy production.

The electric energy supply grid according to the invention is particularly suited to perform the methods according to the invention and to implement the types of implementation of the invention described above.

The grid participant provided according to the invention is particularly well suited to participate in the electric energy supply grid that operates according to the invention to perform the method according to the invention and the types of implementation of the methods according to the invention as described above.

The present invention also concerns a control module for a grid participant in an electric energy supply grid according to the invention, by which the grid participation behaviour can be modified or controlled by the method according to the invention. This control module may be part of a piece of grid participation equipment, but may also be connected with conventional grid participation equipment individually or group-wise, e.g. in the context of building or facility automation. The control module may be implemented as a piece of software, or it may contain such software which also is part of the present invention.

A control module according to the invention could be implemented e.g. by a micro-controller. This determines grid frequency e.g. by a counter, DFT (Discrete Fourier Transformation) or PLL (Phase Locked Loop) and performs priority dependent switching e.g. by a Triac. The micro-controller may be equipped with an interface to other pieces of equipment (loads, grid, and/or producers) and can implement the necessary logic to determine the current priority value.

According to the preferable implementation of the present invention the grid frequency is used to fix the price per energy unit and, at the same time, to transmit the current price per energy unit to the grid participants. Producers and consumers are rewarded or charged by a price per energy unit that is derived directly from the current grid frequency (and possibly may be corrected by other tariff components). Thus within a grid area that is coupled with, or decoupled from, other grid areas e.g. by using HVDC (High Voltage Direct Current) transmission, an energy price develops that is valid for all grid participants in this area, and the basis of energy transactions. Each participating producer, consumer, or operator of storage devices, or of mixtures of these elements, on this basis and with own knowledge of the operational state of their installation, may at any time take a decision if and how they wish to inject or extract electric energy, and will be rewarded or charged with the equivalent price per energy unit. Additional communication equipment and trading platforms are not necessary; the relevant grid frequency can be determined and documented anywhere in the grid with sufficient accuracy and time resolution with low effort and cost.

The present invention therefore provides the technical pre-condition to establish energy trading within electric energy supply grids that stabilizes them, where grid frequency is used to establish the trading price. When price is high, more producers and fewer consumers participate in this trading according to their decentralised algorithms, and vice versa.

Further advantages and properties of the present invention are explained in the following with reference to the figures and specific description of implementations. The figures show the following:

DETAILED DESCRIPTION OF THE PREFERRED EMBODIMENTS

Figure 1:
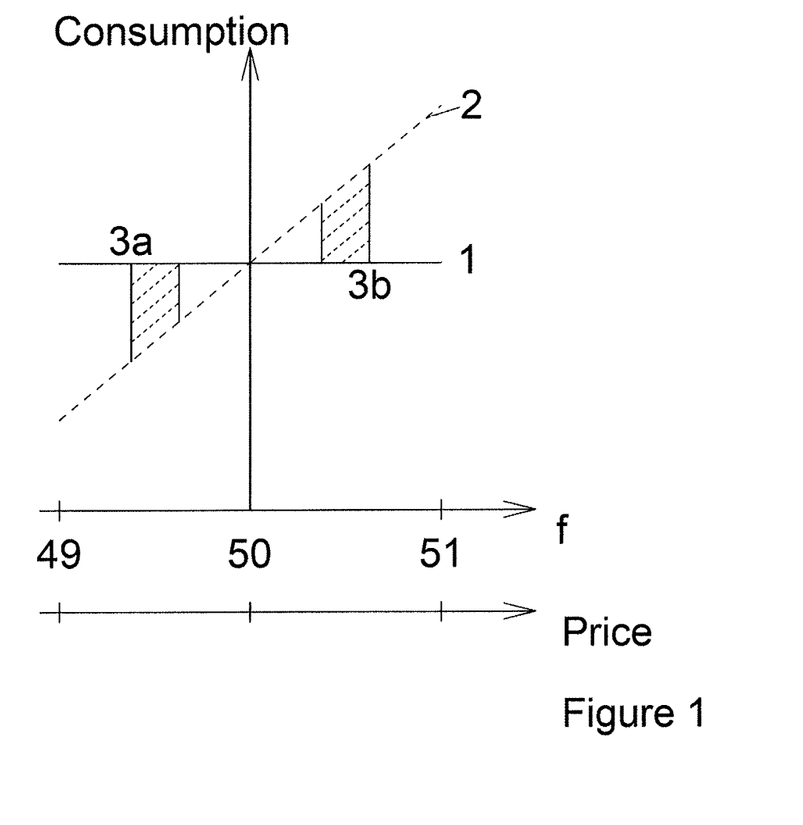
FIG. 1: Comparison of energy consumption profiles with and without the use of the method according to the invention.

FIG. 1 shows a comparison of the resulting energy price with and without the application of the method according to the invention. At the x-axis the frequency in Hertz and the price per energy unit is shown. In this example the base frequency value is 50 Hz and is equivalent to a particular price per energy unit. The base value lies between the minimum value of 49 Hz and the maximum value of 51 Hz. On the y-axis energy consumption is measured. The continuous line 1 shows the energy consumption of a grid participant over a long period without the use of the method according to the invention. It shows an average price for the energy consumed. The broken line 2 shows the consumption of another grid participant during the same period which uses of the method according to the invention. Here a minimum amount of energy is extracted when frequency is low, i.e. when energy price is high. A part of total energy consumption that can be shifted without loss of comfort for the grid participant, shown as the shaded area 3a, has been shifted from time periods with scarce supply to others with oversupply. Time periods with energy oversupply are those with high frequencies and therefore low energy price 3b. By this method total price for energy consumed by the grid participant is reduced.

Figure 2:
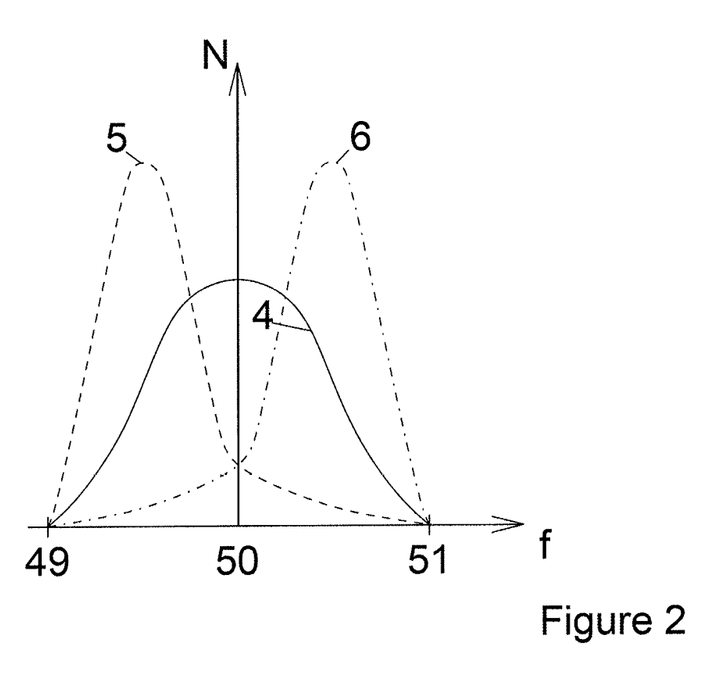
FIG. 2: Three energy consumption profiles of typical grid participants.

FIG. 2 shows three energy consumption profiles of typical grid participants. On the x-axis frequency in Hertz and the price per energy unit is shown. The base value of frequency is 50 Hz here and lies between the minimum value of 49 Hz and the maximum value of 51 Hz. The y-axis shows the number N of how often a certain frequency band is used by a grid participant, i.e. how many time periods during the full observation period the specific grid participant has extracted energy while the grid frequency was within this frequency band. A frequency band here is equivalent to a sub range of the frequency range between minimum and maximum values. Splitting this frequency range into several sub ranges results in a number of frequency bands.

The continuous line 4 shows the energy consumption profile of a grid participant not provided according to the method of the invention. The curve has its maximum at the base value of grid frequency, i.e. the most frequent use and therefore most energy extraction takes place at the average energy price. The curve towards higher and lower frequencies and thus energy prices basically is symmetrical and drops in value. As grid frequency is maintained at the average value equivalent to the base value over a period of e.g. 24 hours, the average use by a grid participant without the method according to the invention occurs at the base value of grid frequency. The average grid participant not provided with the method according to the invention therefore pays the average price per energy unit coupled with the base value of grid frequency.

The broken line 5 shows energy consumption of a consumer with emergency priority. Emergency priority means that this energy consumer has unlimited access to the energy supply grid and will not be switched off independent of grid frequency. A large share of energy units will be drawn from a frequency band with low grid frequency, i.e. high price per energy unit. This curvature is possible with consumers that have no potential to shift energy consumption into periods with oversupply and, in addition, extract energy from the grid at times where normally there is a large demand for it, e.g. during the day.

The chain dotted line 6 shows the price optimized energy consumption of a consumer using the method according to the invention. The maximum of the curve lies in a region with high grid frequency, i.e. a lower price per energy unit. This curvature occurs if energy is extracted from the grid mainly in periods with energy oversupply. This is achieved by shifting energy consuming processes that are not time critical as much as possible to periods with energy oversupply. Thereby substantial savings can be realized on total energy cost. In addition this grid participation behaviour using the methods according to the invention contributes to grid stabilisation, as the grid participation behaviour counteracts the specific deviation of grid frequency from its base value: energy is preferentially extracted from the energy supply grid during periods with oversupply, while in periods with energy scarcity in the energy supply grid consumption is reduced to a minimum.

FIG. 3 shows two possible schematic presentations of splitting the frequency band around the base value between minimum and maximum values, and the associated coding of frequency band splitting.

Figure 3A:
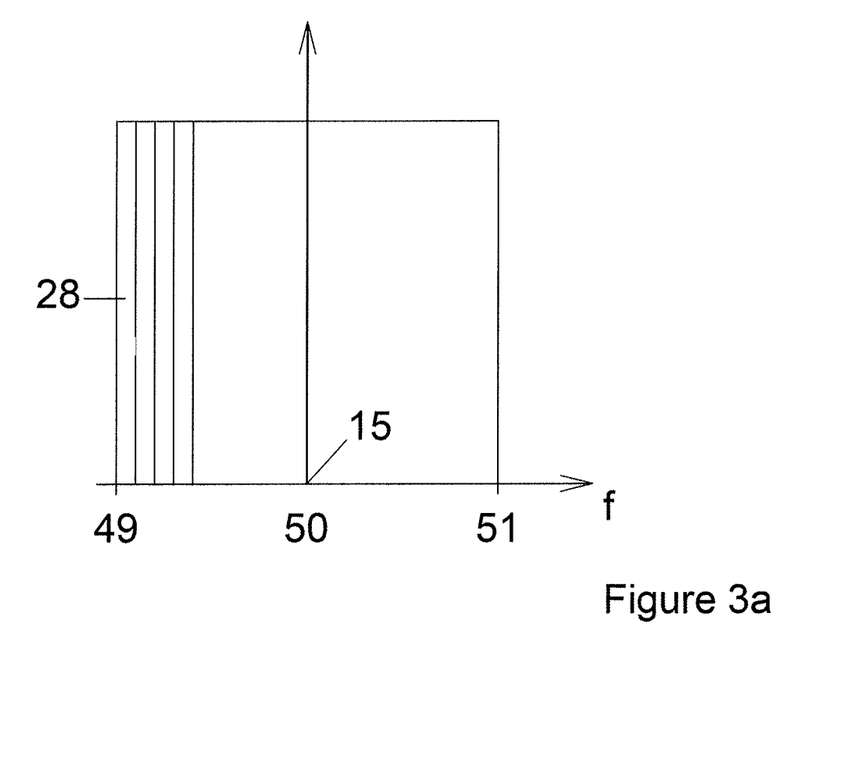
FIG. 3: schematic presentation of frequency band splitting with prioritization.

FIG. 3a shows the type of implementation with evenly split sub ranges. On the x-axis grid frequency f in Hertz around the base value of 50 Hz between the minimum value of 49 Hz and the maximum value of 51 Hz is shown. The frequency range between minimum and maximum frequencies is split into 256 sub ranges 28. Each of these frequency bands shows the same bandwidth of 2/256 Hz. A frequency code equivalent to a number between 0 and 255 is allocated to each of the frequency bands.

Figure 3B:
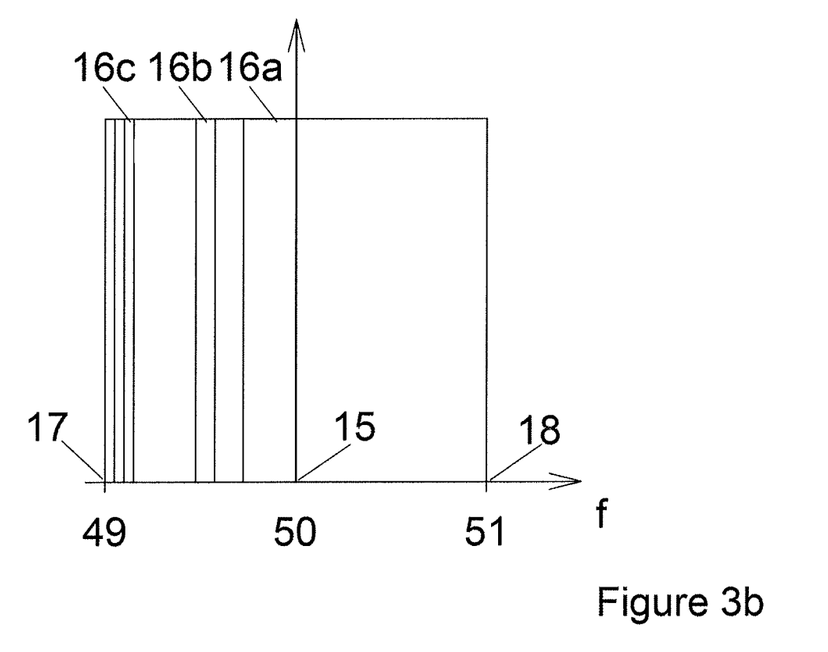

FIG. 3b shows how the frequency range around the base value of 50 Hz between a minimum value of 49 Hz and a maximum value of 51 Hz can be split into sub ranges of different sizes. Starting from base value 15 the width of sub ranges 16a, 16b, 16c drops until minimum value 17 and maximum value 18 are reached. This allows more precise frequency steps in the outer regions of the frequency range. As in the other example, each individual frequency band is associated with a frequency code of a numerical value between 0 and 255.

Figure 4:
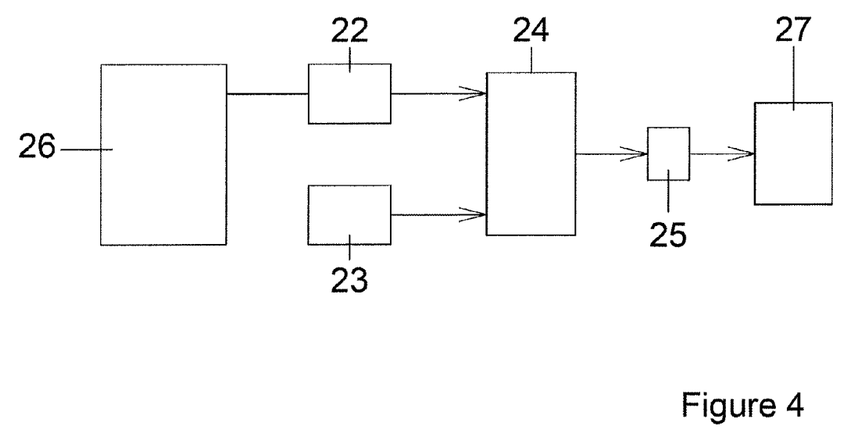
FIG. 4: flow diagram schematically presenting decentralized load management.

FIG. 4 shows a flow chart demonstrating decentralized control and decision process schematically when using the method according to the invention.

In an electric energy supply grid 26 grid frequency is determined de-centrally by a grid participant with a frequency measuring device 22. This grid frequency is converted into a frequency code between 0 and 255 according to one of the schemes described in FIGS. 3a/b. In parallel the grid participant uses a priority algorithm 23 that determines a current priority value. As an example this priority value is described for a refrigerator: A refrigerator has a pre-determined range in which its interior temperature must be kept. This refrigerator by adequate insulation is able to keep this temperature for a certain period. During this period there is no need to actively cool which means the compressor may be switched on later. Therefore this refrigerator has a priority value representing low current energy demand. Over time, the priority value of the refrigerator changes as its temperature approaches the upper limit of the pre-determined temperature range. Its priority value thus drops successively.

The priority value lies within the range of the frequency code. The grid participant compares its current priority value with the frequency code by a comparator 24. The result of this comparison is transferred to switch 25. If the current priority value coincides with the current frequency code, the grid participant changes its grid participation behaviour using switch 25. If the frequency code drops below the priority value of the grid participant, switch 25 stops extraction of electric energy from the supply grid, and if the frequency code rises to reach the priority value, consumer 27 starts to extract energy from the supply grid.

The same logic with an inverted decision is used for injectors of electric energy, i.e. producers and storage devices. In the example of a small combined heat and power plant (μCHP) this would look as follows: the μCHP plant determines a priority value depending on the state of charge of an associated thermal storage and the current demand for thermal energy that is taken from that thermal storage. If the thermal storage contains only little energy and the current demand of thermal energy taken from the storage is small, the priority value of the μCHP is set at a small value which means the μCHP plant is switched on only if a low value of the frequency code signals a high demand for electric energy and therefore high income for any producer of such.

If now the demand for thermal energy rises on the location of the μCHP plant, its priority value is successively increased such that it will switch on also with a lower demand for electric energy by the supply grid. The income from energy injected will thus be lower, but it is ensured that the demand for thermal energy is met in any case.

A grid participant that operates a storage device can use this logic, and will set its priority value according to the storage capacity utilized.

FIG. 5 shows an implementation example of the method according to the invention for the charging process of an electric vehicle.

Figure 5A:
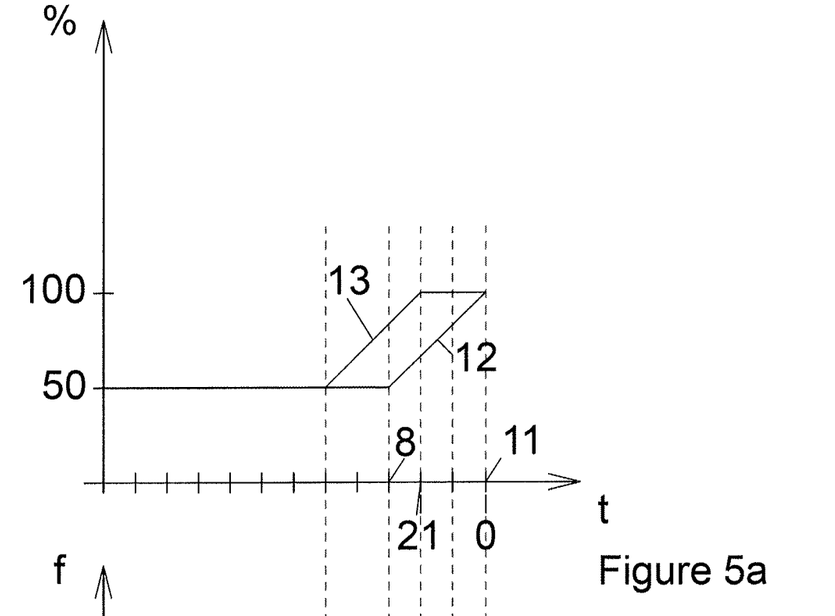
FIG. 5: Example implementation of the method according to the invention for electric vehicle charging.

In FIG. 5a the x-axis shows the time t in hours until the next use of the electric vehicle. At time 11 the battery of the electric vehicle must be charged fully to ensure the vehicle can be utilized without any loss of comfort. The y-axis shows the State of Charge (SOC) of the battery in percent.

Figure 5B:
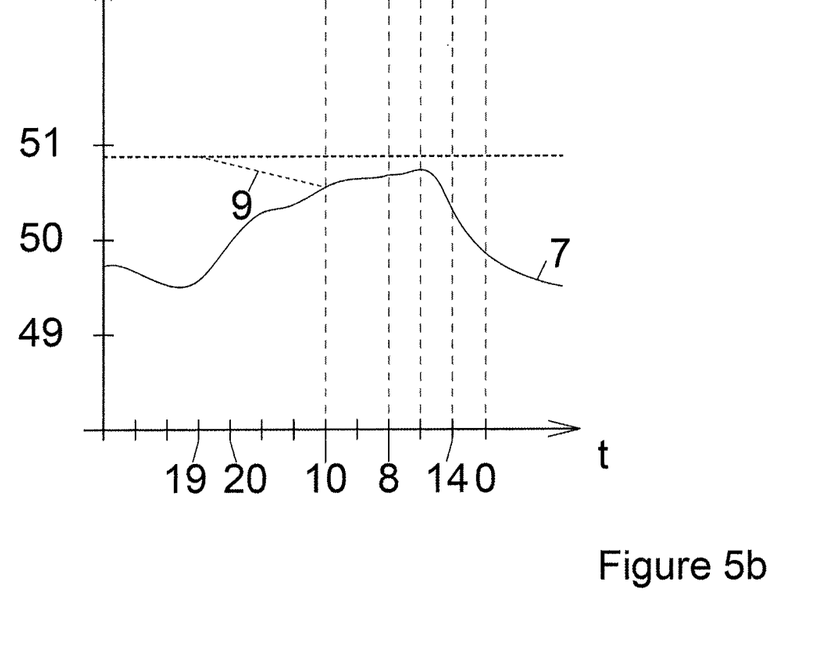

In FIG. 5b the x-axis also shows the time t in hours until the next use of the electric vehicle. The y-axis here shows the frequency of the electric energy supply grid with a base value of 50 Hz between a minimum value of 49 Hz and a maximum value of 51 Hz.

The algorithm of the electric vehicle is provided such that the starting time for battery charging is delayed until it becomes urgent, unless before this time there is an oversupply of energy. The current SOC of the battery requires a minimum charging period of 3 hours to fully charge the battery. At time 8 latest, t=3 h until beginning of the use of the vehicle charging must begin to ensure batteries are fully charged with a state of charge of 100% at time 11 of use t=0 h. If during the period until time 8, t=3 h until beginning of the use of the vehicle no strong oversupply occurs, the battery charger of the vehicle remains switched off. Then charging only begins at the latest possible time 8, t=3 h. The process of charging is shown in FIG. 5a with continuous line 12.

FIG. 5b shows two possible ways of implementation. In the first method described above the algorithm of the electric vehicle is provided such that charging time is delayed until it becomes absolutely necessary, unless before this time a strong oversupply of energy becomes available. The threshold at which an oversupply of energy is detected in this case is set slightly below 51 Hz. The second way of implementing the algorithm provides that the threshold, at which an oversupply, i.e. an elevation of grid frequency above base value, is detected by the algorithm, drops over time. As soon as grid frequency rises above this new threshold charging is initiated also here. The threshold at which energy oversupply is detected by the algorithm begins to drop at time 19 that can be freely chosen from e.g. t=9 h until beginning of use of vehicle and falls continuously until time of use 11. Thus as time progresses, i.e. with less time remaining until the vehicle is to be used, the starting of the charging process becomes more probable even with a lower deviation from the base value. Thus the algorithm is designed such that when remaining time until use of the electric vehicle is long, it speculates on a strong energy oversupply and thus on a low price. With decreasing remaining time until use of the electric vehicle a weaker supply and thus higher cost of energy, which still is below base price, is accepted.

In FIG. 5b the y-axis shows grid frequency with a base value of 50 Hz between a minimum value of 49 Hz and a maximum value of 51 Hz. On the x-axis also here time t in hours until the next use of the electric vehicle is sketched. The development of grid frequency depending on time is shown by continuous line 7. Initially grid frequency is within an area below the base value of 50 Hz. Starting at time 20, t=8 h until the beginning of time of use of the vehicle grid frequency rises above base value for the first time, and then continues above this base value until time 14, t=1 h before beginning of use. At time 14, t=1 h until beginning of use grid frequency drops below base value again.

In the first way of implementation described above where the algorithm is designed such that charging is delayed until it becomes necessary unless before this time a strong energy oversupply becomes available, charging of the electric vehicle begins at the latest possible time 8, t=3 h before time of use. As grid frequency in its previous development does not significantly rise above base value, the threshold for "strong energy oversupply" is not reached. The algorithm does not detect an oversupply below the predefined threshold and therefore does not provide a start signal for charging. Time 8 characterizes the time at which charging starts. From this point in time until start of use of the vehicle only the time remains available that corresponds with the minimum charging time of the battery. The grid participant in this case does not benefit from the method according to the invention.

In the second way of implementation described above the algorithm of the electric vehicle is designed such that the threshold detecting an oversupply of energy drops over time. That means in this case that the threshold, at which the algorithm detects a rising of grid frequency above base frequency as being a "strong oversupply", drops. The development of this threshold depending on time is shown by broken line 9. By this measure the time when charging is initiated shifts from time 8, t=3 h before time of use to time 10, t=5 h before time of use. As time progresses, i.e. as time remaining until the electric vehicle is to be used reduces, the start of charging becomes more probable even for small positive deviations from the base value. Continuous line 10 shows the time when charging starts.

When comparing both ways of implementation in FIG. 5b it becomes obvious that charging with a lowering of the threshold starts at an earlier time 10 than without a lowering of threshold 8. The course of charging with falling threshold is shown in FIG. 5a by broken line 13. The battery of the electric vehicle in this case is fully charged already at time 13, t=2 h before time of use.

From time 14, t=1 h before time of use grid frequency again drops below the base value of 50 Hz. Within the electric energy supply grid increased load and, as a result, scarcity of energy prevails again. This means that price per energy unit rises above the average base price that is associated with base frequency value.

A comparison of the two ways of implementation with or without lowering of the threshold shows that with falling threshold charging is completed already at time 14. Charging therefore completely took place during periods in which energy oversupply prevailed and therefore a reduced price per energy unit was to be applied. Without lowering of the threshold charging is not fully completed at time 14. Only at time 11 the battery of the electric vehicle is fully charged. In this case for a part of the energy extracted during periods of grid frequency below the base value a higher price per energy unit must be paid. The use of the method according to the invention with adaptation of the threshold leads to a substantial saving on total energy cost for electric vehicle battery charging.

In addition this grid participant behaviour according to the invention contributes to grid stabilisation also: Energy is preferably extracted during periods with energy oversupply in the electric grid, while during periods with energy scarcity consumption is limited to a minimum.

The invention claimed is:

1. A method to control a ratio between electrical energy injected into and extracted from an electric energy supply grid with a number of participants, which include energy producers and consumers, comprising: using a grid state variable as a control variable whose value depends on the ratio between the electrical energy injected and extracted, and which is determinable by the grid participants from the grid itself, and at least some of the grid participants determining the grid state variable in a decentralised way from the grid and use said grid state variable at least indirectly to control their own behaviour concerning the injection of electric energy into the electric grid, also at least some of the consumers determining said grid state variable in a decentralized way and use said grid state variable at least indirectly to control their own behaviour concerning the extraction of electric energy from the energy supply grid, coupling the grid state variable with a valuation variable such that the valuation variable has a base value if the ratio between electric energy injected into and extracted from the grid is optimal, and if said ratio deviates from said optimum, deviating the valuation variable from the base value such that in case of a surplus of electrical energy injected, injection of energy into the grid creates a malus value and extraction creates a bonus value, and, in case of a surplus energy extracted, injection of energy into the grid creates a bonus value and extraction creates a malus value, and the grid participants which control their own specific grid participation behaviour that depends on at least one of the grid state variable or the valuation variable, determining the grid state variable within certain intervals or continuously and using the grid state value to control their own specific participation behaviour, and using a specific algorithm which considers a specific time dependent demand function and includes predictions of likely future developments of the value of the valuation variable, the specific algorithm combining the specific time dependent demand function with the predictions such that at least one of as little malus or as many bonus values as possible are generated, for decentralized stabilizing of the electric energy supply grid; the grid state variable having a range between maximum and minimum values, and splitting the range between a maximum and minimum value of the grid state variable into a certain number of sub ranges, and assigning a sub range value of the valuation variable to each of the sub ranges; and the grid participants which control their own specific grid participation behaviour depending on at least one of the grid state variable or the valuation variable, using a priority algorithm to determine a current priority value which is equivalent to a sub range value of the valuation variable, and comparing said current priority value continuously or within certain intervals with the current sub range value and connecting to or disconnecting from the grid if the current priority value equals the current sub range value.

2. The method according to claim 1, wherein a variable price per electric energy unit is used as the valuation variable.

3. The method according to claim 1, wherein the demand function contains limit values and the specific grid participation behaviour changes when the limit values are reached.

4. The method according to claim 1, further comprising maintaining the grid state variable between the maximum and the minimum value by decentralized determination and control of the specific grid participation behaviour, and in case the grid state variable leaves the range between the maximum and the minimum values, taking central regulatory control measures to ensure the grid state variable stays within the desired range between maximum and minimum values.

5. The method of claim 1, wherein the participants further include storage devices.

6. An electric energy supply grid with a number of participants which include producers and consumers, and with a grid state variable whose value depends on a ratio between electric energy injected and extracted, and which is determinable by grid users from the grid itself, where at least some of the producers are provided such that they determine the grid state variable in a decentralized way from the grid and at least indirectly use the grid state variable to control their own specific grid participation behaviour concerning the injection of electric energy into the grid, also at least some of the consumers are provided such that said consumers determine the grid state variable in a decentralized way from the grid and at least indirectly use the grid state variable to control their own specific grid participation behaviour concerning the extraction of electric energy from the grid, the grid state variable is coupled with a valuation variable such that the valuation variable assumes a base value when the ratio between electric energy injected and extracted is optimal, and if said ratio deviates from the optimum, the valuation variable also deviates from the base value such that, in case of surplus electric energy being injected, the injection of electric energy leads to generation of a malus value, and extraction to the generation of a bonus value, and in case of surplus electric energy being extracted, the injection of electric energy leads to the generation of a bonus value, and extraction to the generation of a malus value, the grid participants which control their own specific grid participation behaviour depending on at least one of the grid state variable or the valuation variable are provided such that the grid participants determine the grid state variable continuously or within certain intervals and use the grid state value to control of their own specific grid participation behaviour, and a specific algorithm is used which considers a specific time dependent demand function and includes predictions of likely future developments of the valuation variable, and the specific algorithm combines the specific time dependent demand function with the predictions such that at least one of a number of malus values is minimized or a number of bonus values is maximized, for decentralized stabilizing of the electric energy supply grid; the grid state variable having a range between maximum and minimum values, and splitting the range between a maximum and minimum value of the grid state variable into a certain number of sub ranges, and assigning a sub range value of the valuation variable to each of the sub ranges; and the grid participants which control their own specific grid participation behaviour depending on at least one of the grid state variable or the valuation variable, using a priority algorithm to determine a current priority value which is equivalent to a sub range value of the valuation variable, and comparing said current priority value continuously or within certain intervals with the current sub range value and connecting to or disconnecting from the grid if the current priority value equals the current sub range value.

7. An apparatus for participants of an electric energy supply grid according to claim 6 provided to extract energy from the grid, wherein said apparatus is programmed to determine the grid state variable within certain time intervals or continuously from the grid and is adapted to use the grid variable at least indirectly to control its own specific grid participation behaviour concerning the extraction of electric energy from the grid, using the specific algorithm which considers the specific time dependent demand function as well as the predictions of likely developments of the valuation variable, and the specific algorithm combines the specific time dependent demand function with the predictions of the valuation variable such that at least one of as few malus values or as many bonus values as possible are generated.

8. The apparatus for participants of an electric energy supply grid according to claim 7, wherein said apparatus includes the demand function that contains limit values and the specific grid participation behaviour changes when these are reached.

9. A control module for one or a group of equipment of participants of an electric energy supply grid according to claim 6.

10. An apparatus for participants of an electric energy supply grid with a number of participants which include producers and consumers, the electric energy supply grid having a grid state variable whose value depends on a ratio between electric energy injected and extracted, and which is determinable by grid users from the grid itself, where at least some of the producers are provided such that they determine the grid state variable in a decentralized way from the grid and at least indirectly use the grid state variable to control their own specific grid participation behaviour concerning the injection of electric energy into the grid, also at least some of the consumers are provided such that said consumers determine the grid state variable in a decentralized way from the grid and at least indirectly use the grid state variable to control their own specific grid participation behaviour concerning the extraction of electric energy from the grid, the grid state variable is coupled with a valuation variable such that the valuation variable assumes a base value when the ratio between electric energy injected and extracted is optimal, and if said ratio deviates from the optimum, the valuation variable also deviates from the base value such that, in case of surplus electric energy being injected, the injection of electric energy leads to generation of a malus value, and extraction to the generation of a bonus value, and in case of surplus electric energy being extracted, the injection of electric energy leads to the generation of a bonus value, and extraction to the generation of a malus value, the grid participants which control their own specific grid participation behaviour depending on at least one of the grid state variable or the valuation variable are provided such that the grid participants determine the grid state variable continuously or within certain intervals and use the grid state value to control of their own specific grid participation behaviour, and a specific algorithm is used which considers a specific time dependent demand function and includes predictions of likely future developments of the valuation variable, and the specific algorithm combines the specific time dependent demand function with the predictions such that at least one of a number of malus values is minimized or a number of bonus values is maximized;

said apparatus is programmed to determine the grid state variable within certain time intervals or continuously from the grid and is adapted to use the grid variable at least indirectly to control its own specific grid participation behaviour concerning the extraction of electric energy from the grid, using the specific algorithm which considers the specific time dependent demand function as well as the predictions of likely developments of the valuation variable, and the specific algorithm combines the specific time dependent demand function with the predictions of the valuation variable such that at least one of as few malus values or as many bonus values as possible are generated, said apparatus is further programmed with a priority algorithm adapted to determine a current priority value that is equivalent to a sub range value of the valuation variable, and compares said current priority value continuously or within certain intervals with the current sub range value, and connects to or disconnects from the grid if the current priority value and sub range value are equal.

* * * * *